United States Patent
Tao et al.

(10) Patent No.: US 12,486,387 B2
(45) Date of Patent: Dec. 2, 2025

(54) POLYMER COMPOSITION BLEND AND MEMBRANES MADE THEREFROM

(71) Applicant: Celanese International Corporation, Irving, TX (US)

(72) Inventors: Fangfang Tao, Shanghai (CN); Christian Ohm, Gernsheim (DE); Yingying Sun, Shanghai (CN); David Ditter, Mainz (DE)

(73) Assignee: Celanese International Corporation, Irving, TX (US)

(*) Notice: Subject to any disclaimer, the term of this patent is extended or adjusted under 35 U.S.C. 154(b) by 236 days.

(21) Appl. No.: 18/124,848

(22) Filed: Mar. 22, 2023

(65) Prior Publication Data
US 2023/0303811 A1 Sep. 28, 2023

Related U.S. Application Data

(60) Provisional application No. 63/322,468, filed on Mar. 22, 2022.

(51) Int. Cl.
*C08L 23/06* (2006.01)
*B01D 69/02* (2006.01)
(Continued)

(52) U.S. Cl.
CPC .............. *C08L 23/06* (2013.01); *B01D 69/02* (2013.01); *B01D 71/261* (2022.08); *H01M 50/417* (2021.01); *B01D 2325/02* (2013.01); *B01D 2325/04* (2013.01); *B01D 2325/20* (2013.01); *B01D 2325/24* (2013.01); *B01D 2325/341* (2022.08); *C08L 2205/025* (2013.01); *C08L 2207/068* (2013.01)

(58) Field of Classification Search
CPC ...... B01D 69/00–69/148; H01M 50/00–50/77; C08L 23/04–23/0838; C08L 2023/44; C08L 2207/068
See application file for complete search history.

(56) References Cited

U.S. PATENT DOCUMENTS

| | | |
|---|---|---|
| 4,399,035 A | 8/1983 | Nohmi et al. |
| 4,588,633 A | 5/1986 | Kono et al. |

(Continued)

FOREIGN PATENT DOCUMENTS

| | | |
|---|---|---|
| CN | 102558644 B | 7/2012 |
| CN | 105367880 A | 3/2016 |

(Continued)

OTHER PUBLICATIONS

Machine translation of CN106252563. Retrieved Jul. 3, 2025.*
PCT Search Report Corresponding to Application No. PCT/US2023/015856 on Jun. 7, 2023.

*Primary Examiner* — Prashant J Khatri
(74) *Attorney, Agent, or Firm* — Dority & Manning, P.A.

(57) ABSTRACT

A polymer composition for producing gel extruded articles is described. The polymer composition contains at least three different polyethylene polymers, namely a lower molecular weight polyethylene polymer, a mid-range molecular weight polyethylene polymer, and a high molecular weight polyethylene polymer. Combining the different polyethylene polymers in different ratios can optimize not only mechanical properties but improve processing.

19 Claims, 1 Drawing Sheet

(51) Int. Cl.
*B01D 71/26* (2006.01)
*H01M 50/417* (2021.01)

(56) References Cited

U.S. PATENT DOCUMENTS

| | | |
|---|---|---|
| 6,632,850 B2 | 10/2003 | Hughes et al. |
| 7,241,832 B2 | 7/2007 | Khemani et al. |
| 7,323,274 B1 * | 1/2008 | Samii ................ B01D 67/0009 |
| | | 429/251 |
| 7,619,026 B2 | 11/2009 | Yang et al. |
| 7,781,094 B2 | 8/2010 | Yamada et al. |
| 8,075,818 B2 | 12/2011 | Funaoka et al. |
| 8,778,525 B2 | 7/2014 | Kikuchi et al. |
| 2007/0221567 A1 | 9/2007 | Simmons et al. |
| 2016/0043372 A1 | 2/2016 | Simmons et al. |
| 2016/0329609 A1 | 11/2016 | Kikuchi et al. |
| 2017/0349678 A1 * | 12/2017 | Kretzschmar ........... C08L 23/06 |
| 2019/0055385 A1 * | 2/2019 | Ohm ....................... C08L 91/00 |
| 2021/0108056 A1 | 4/2021 | Ohm et al. |

FOREIGN PATENT DOCUMENTS

| | | |
|---|---|---|
| CN | 106252563 A | 12/2016 |
| EP | 1947138 A1 | 7/2008 |
| EP | 2414088 B1 | 1/2019 |

* cited by examiner

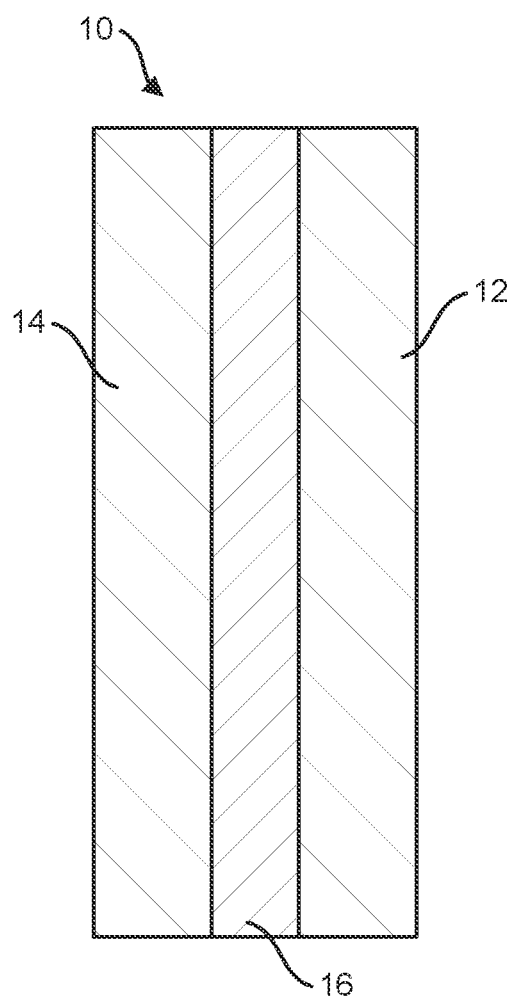

POLYMER COMPOSITION BLEND AND MEMBRANES MADE THEREFROM

RELATED APPLICATIONS

The present application is based upon and claims priority to U.S. Provisional Patent Application Ser. No. 63/322,468, having a filing date of Mar. 22, 2022, which is incorporated herein by reference.

BACKGROUND

Polyethylene polymers have numerous and diverse uses and applications. For example, high density polyethylene polymers are valuable engineering plastics with a unique combination of abrasion resistance, surface lubricity, chemical resistance and impact strength. They find application in the production of high strength fibers for use in ropes and anti-ballistic shaped articles and in the production of other elongated articles, such as membranes for electronic devices. However, since the flowability of these materials in the molten state decreases as the molecular weight increases, processing by conventional techniques, such as melt extrusion, is not always possible.

One alternative method for producing fibers and other elongated components from polyethylene polymers is by gel-processing in which the polymer is combined with a solvent. The resultant gel is extruded into a fiber or membrane and may be stretched in one or two directions as a substantial portion of the solvent is removed.

Membranes made from polyethylene polymers through gel-processing can be formed to have many beneficial properties. For instance, the membranes can be formed with micro-pores. Microporous polyethylene membranes formed through gel-processing, for instance, are particularly well suited for use as a separator in a battery, such as a lithium ion battery. The microporous membrane, for instance, can separate an anode from a cathode and prevent a short circuit between the active battery components. At the same time, the microporous membrane permits ions to pass through due to the porous nature of the material. The ion permeability characteristics of the microporous polyethylene membrane makes the material particularly well suited for regulating electrochemical reactions within the battery.

In addition to the microporous nature of the polyethylene membrane and to possessing chemical resistance and other physical properties, the polyethylene membranes also offer what is referred to in the art as having an effective "shutdown effect". The shutdown effect refers to the self-closing of micro-pores within the polyethylene separator when it surpasses a certain temperature. When the pores in the polyethylene membrane are closed upon reaching a certain temperature, ions can no longer pass through the membrane and the electrochemical function of the battery stops. This effect becomes an important safety feature for the battery as it prevents thermal runaway reactions from continuing and prevents the battery from overheating and creating a potentially hazardous situation.

In addition to chemical resistance and shutdown properties, polymer membranes should also have very good mechanical properties. For instance, microporous membranes, especially when used as a separator in battery applications, should have relatively high puncture strength, tensile strength, and tensile modulus. In this regard, there is a constant need to improve the above membrane properties.

The present disclosure is directed to improving at least one of the above properties through using particular polymer formulations.

SUMMARY

In general, the present disclosure is directed to polymer compositions particularly well suited for gel-processing applications in order to produce various articles, such as fibers and membranes. The polymer composition of the present disclosure contains a blend of different polymers, such as at least three different polyethylene polymers, that when blended together produce an excellent combination of mechanical and physical properties. For instance, membranes can be produced according to the present disclosure that have excellent puncture strength and/or pin strength in combination with an optimum amount of porosity. The membranes are particularly well suited for use as a membrane in a lithium ion battery for separating an anode from a cathode.

In one embodiment, the present disclosure is directed to a polymer composition for producing gel extruded articles that comprises a plasticizer in combination with polymer particles. The polymer particles include a first polyethylene polymer, a second polyethylene polymer, and a third polyethylene polymer. The first polyethylene polymer can have a molecular weight of from about 300,000 g/mol to about 1 million g/mol. The first polyethylene polymer can be present in the polymer composition in an amount from about 3% by weight to about 25% by weight of the polymer particles. The second polyethylene polymer can have a molecular weight of from about 1 million g/mol to about 2.9 million g/mol. The second polyethylene polymer can be present in an amount from about 25% by weight to about 85% by weight based on the weight of the polymer particles. The third polyethylene polymer can have a molecular weight of from about 2 million g/mol to about 10 million g/mol and can be present in the polymer composition in an amount from about 5% by weight to about 48% by weight based on the weight of the polymer particles.

In one aspect, the polymers present in the polymer composition only include the first polyethylene polymer, the second polyethylene polymer, and the third polyethylene polymer. The polymer composition can be formulated so as to be free of polypropylene. The polymer particles contained in the composition can be made from only one of the polyethylene polymers or can be made from a blend of two or three of the polyethylene polymers.

In one embodiment, the first polyethylene polymer has a molecular weight of from about 500,000 g/mol to about 700,000 g/mol and can be present in the polymer composition in an amount from about 5% by weight to about 15% by weight of the polymer particles. The second polyethylene polymer, on the other hand, can have a molecular weight of from about 1.5 million g/mol to about 2.1 million g/mol and can be present in the polymer composition in an amount from about 50% by weight to about 75% by weight of the polymer particles. The third polyethylene polymer can have a molecular weight of from about 4 million g/mol to about 8 million g/mol and can be present in the polymer composition in an amount from about 20% by weight to about 40% by weight of the polymer particles. Although particle size can vary, the polymer particles can have a median particle size by volume of from about 70 microns to about 210 microns, such as from about 110 microns to about 170 microns. The polymer particles can be present in the polymer composition in an amount up to about 50% by weight.

In general, any suitable plasticizer may be present in the polymer composition. The plasticizer, for example, can comprise a mineral oil, a paraffinic oil, a hydrocarbon, an alcohol, an ester, an ether, or mixtures thereof. Particular examples of plasticizers include decaline, paraffin oil, white oil, mineral oil, xylene, dioctyl phthalate, dibutyl phthalate, stearyl alcohol, oleyl alcohol, decyl alcohol, nonyl alcohol, diphenyl ether, n-decane, n-dodecane, octane, nonane, kerosene, toluene, naphthalene, tetraline, monochlorobenzene, camphene, methane, dipentene, methylcyclopentandiene, tricyclodecane, 1,2,4,5-tetramethyl-1,4-cyclohexadiene, or mixtures thereof.

The present disclosure is also directed to a process for producing polymer articles. The process includes forming a gel-like composition from the polymer composition described above. The gel-like composition is then extruded through a die to form a polymer article. The polymer article, for example, can comprise a film or can comprise fibers. The process can further include the step of removing at least a part of the plasticizer from the polymer article. For example, greater than 90% by weight, such as greater than about 95% by weight of the plasticizer can be removed. In order to facilitate removal of the plasticizer, an extraction solvent can be present in the gel-like composition. The extraction solvent can comprise dichloromethane, acetone, chloroform, an alkane, hexene, heptene, an alcohol, or mixtures thereof.

The present disclosure is also directed to a porous membrane that is particularly well suited for use as a separator in batteries. The porous membrane comprises a polymer blend including a first polyethylene polymer, a second polyethylene polymer, and a third polyethylene polymer. The first polyethylene polymer can have a molecular weight of from about 400,000 g/mol to about 1 million g/mol. The second polyethylene polymer can have a molecular weight of from about 1.1 million g/mol to about 2.9 million g/mol. The third polyethylene polymer can have a molecular weight of from about 3 million g/mol to about 10 million g/mol. The first polyethylene polymer can be present in the porous membrane in an amount from about 3% by weight to about 18% by weight. The second polyethylene polymer can be present in the porous membrane in an amount from about 34% by weight to about 85% by weight. The third polyethylene polymer can be present in the porous membrane in an amount from about 12% by weight to about 48% by weight.

Membranes made according to the present disclosure can have a tensile strength of greater than about 155 MPa. The porous membrane can have a puncture strength of greater than about 1,450 mN/micron and a pin strength of greater than about 252 gf/g/cm$^2$. The above physical properties can be realized when the membrane has a porosity of from about 35% to about 38%.

When the membrane has a porosity of from about 45% to about 50%, the membrane can have a puncture strength of greater than about 340 mN/micron and a pin strength of greater than about 72 gf/g/cm$^2$.

The membrane can be biaxially stretched and can have a thickness of from about 5 microns to about 20 microns, such as from about 6 microns to about 15 microns. The membrane can have a Gurley permeability of greater than about 105 sec/100 ml.

Other features and aspects of the present disclosure are discussed in greater detail below.

BRIEF DESCRIPTION OF THE DRAWINGS

The present disclosure may be better understood with reference to the following FIGURE:

FIG. 1 is a cross-sectional view of an electronic device, such as a battery, incorporating a porous membrane made in accordance with the present disclosure.

Repeat use of reference characters in the present specification and drawings is intended to represent the same or analogous features or elements of the present invention.

DEFINITIONS

As used herein, puncture strength is measured according to ASTM Test D3763 and measures the ability of a membrane to withstand a foreign particle from causing a hole or defect. The test is conducted on a testing device, such as an Instron CEAST 9340 device. The drop height is 0.03 to 1.10 m. The impact velocity is 0.77 to 4.65 m/s. The maximum dropping mass is 37.5 kg and the maximum potential energy is 405 J. Puncture strength is measured in slow speed puncture mode at 1.67 mm/s.

The melt flow rate of a polymer or polymer composition is measured according to ISO Test 1133 at 190° C. and at a load of 21.6 kg.

The density of a polymer is measured according to ISO Test 1183 in units of g/cm$^3$.

Average particle size (d50) is measured using laser diffraction/light scattering, such as a suitable Horiba light scattering device.

The average molecular weight of a polymer is determined using the Margolies' equation.

Tensile modulus, tensile stress at yield, tensile strain at yield, tensile stress at 50% break, tensile stress at break, and tensile nominal strain at break are all measured according to ISO Test 527-2/1B.

Gurley permeability can be measured according to the Gurley Test, using a Gurley permeability tester, such as Gurley Densometer, Model KRK 2060c commercially available from Kumagai Riki Kogyo Co., LTD. The test is conducted according to ISO Test 5636. The Gurley Test measures air permeability as a function of the time required for a specified amount of air to pass through a specified area under a specified pressure. The units are reported in sec/100 ml.

Porosity (%) is measured according to the following procedure. During the procedure, the following ASTM Standards are used as a reference: D622 Standard Test Method for Apparent Density of Rigid Cellular Plastics1; and D729 Standard Test Methods for Density and Specific Gravity (Relative Density) of Plastics by Displacement1. The following instruments are used: Calibrated Analytical Balance (0.0001 grams); Lorentzen & Wettre Micrometer, code 251 (0.1 um); and Deli 2056 art knife.

Procedure:
1.1. Samples and Sample Preparation
   Using the specimen art knife, cut each sample material into a minimum of three 60 mm±0.5 by 60 mm±0.5 specimens
1.2. Instrument and Measurement
   3.2.1 Using the L&W micrometer, take five readings of the thickness at each 60 mm by 60 mm specimen (average of 5 readings). Record this value as the thickness of this specimen.
   3.2.2 Weigh the specimen directly on the balance. Record this value as the weight of this specimen.
   3.2.3 The three specimens of the same sample are placed together and steps
   2.2.1 and 3.2.2 are repeated to obtain the [bulk] thickness and the [bulk] weight.

Calculate the density to three significant FIGURES as follows
a.

$$D_{film} = \text{Density (film)} = \frac{\text{Wt. of Specimen}}{THK^* \text{ Square}}$$

$D_{film}$ = density of specimen, mg/mm3

Wt = weight of specimen, mg

THK = thickness of specimen, mm

Square = area of specimen, (mm2)

b. Dpolymer=Density (polymer) 0.95 (g/cm3)
Dpolymer: Density of raw materials, without the pores.
c. Porosity=(1−Dfilm/Dpolymer)*100%

DETAILED DESCRIPTION

It is to be understood by one of ordinary skill in the art that the present discussion is a description of exemplary embodiments only and is not intended as limiting the broader aspects of the present disclosure.

In general, the present disclosure is directed to a polymer composition well suited for producing gel extruded articles, such as fibers and films, including porous membranes. The polymer composition contains a plurality of polyethylene resins, such as high density polyethylene particles, combined with a plasticizer that is used to facilitate the formation of articles. As the articles are being formed, the plasticizer can be evaporated and removed leaving extruded articles having improved mechanical properties.

In accordance with the present disclosure, the gel extruded articles are formed using at least three different types of polyethylene polymers. All of the polyethylene polymers can be high density polyethylene polymers. In one aspect, the articles are formed from a first polyethylene polymer having a relatively low molecular weight, a second polyethylene polymer having a mid-range molecular weight and a third polyethylene polymer having a relatively high molecular weight. The second polyethylene polymer can be present in the composition and articles in amounts greater than the first polyethylene polymer and the third polyethylene polymer.

Combining the first polyethylene polymer and the third polyethylene polymer with the second polyethylene polymer can produce various advantages and benefits. For example, porous membranes formed from the combination of polymers can have improved mechanical properties. For example, in comparison to a membrane made only from the second polyethylene polymer, membranes made from the blend of the three different polyethylene polymers can have an increase in puncture strength of greater than about 2%, such as greater than about 5%, such as greater than about 8%, such as greater than about 12%, such as greater than about 15%, such as greater than about 20%, and generally less than about 80% at the same porosity levels. Membranes made according to the present disclosure can also have an increase of pin strength of greater than about 3%, such as greater than about 5%, such as greater than about 8%, such as greater than about 10%, such as greater than about 15%, such as greater than about 17%, and generally less than about 70% in comparison to a membrane only made with the second polyethylene polymer at the same porosity level.

The machine direction and cross-machine direction tensile strength in membranes made according to the present disclosure can also be improved in relation to a membrane made only from the second polyethylene polymer at the same porosity levels and thickness. For example, tensile strength in either direction can be increased by greater than about 2%, such as greater than about 4%, such as greater than about 5%, such as greater than about 10%, and generally less than about 50%.

In addition to improved mechanical properties, combining a lower molecular weight polyethylene and a higher molecular weight polyethylene with a mid-range molecular weight polyethylene has also been found to dramatically improve the ability of the resulting composition to be melt processed into articles. In addition, the ratio and amounts of the different polyethylene polymers can be adjusted and controlled in order to optimize one or more resulting property in the final product, which is not possible when producing articles from a single polyethylene polymer.

In one embodiment, although optional, each of the polyethylene polymers incorporated into the polymer composition are high density polyethylene polymers. For example, each of the polyethylene polymers can have a density of about 0.92 g/cm$^3$ or greater, such as about 0.93 g/cm$^3$ or greater, such as about 0.94 g/cm$^3$ or greater, and generally less than about 1 g/cm$^3$, such as less than about 0.97 g/cm$^3$.

The polyethylene polymers can be made from over 90% ethylene derived units, such as greater than 95% ethylene derived units, or from 100% ethylene derived units. The polyethylene can be a homopolymer or a copolymer, including a terpolymer, having other monomeric units.

The first polyethylene polymer, the second polyethylene polymer, and the third polyethylene polymer each have a different range of molecular weights. In one aspect, the first polyethylene polymer can be a high molecular weight polyethylene polymer, the second polyethylene polymer can be a very high molecular weight polyethylene polymer, and the third polyethylene polymer can be an ultrahigh molecular weight polyethylene polymer. "High molecular weight polyethylene" refers to polyethylene compositions with an average molecular weight of at least about $3 \times 10^5$ g/mol and, as used herein, is intended to include very-high molecular weight polyethylene and ultra-high molecular weight polyethylene. For purposes of the present specification, the molecular weights referenced herein are determined in accordance with the Margolies equation ("Margolies molecular weight").

"Very-high molecular weight polyethylene" refers to polyethylene compositions with a weight average molecular weight of about $1 \times 10^6$ g/mol to about $3 \times 10^6$ g/mol. In some embodiments, the molecular weight of the very-high molecular weight polyethylene composition is between about $2 \times 10^6$ g/mol and less than about $3 \times 10^6$ g/mol.

"Ultra-high molecular weight polyethylene" refers to polyethylene compositions with an average molecular weight of at least about $3 \times 10^6$ g/mol. In some embodiments, the molecular weight of the ultra-high molecular weight polyethylene composition is between about $3 \times 10^6$ g/mol and about $30 \times 10^6$ g/mol, or between about $3 \times 10^6$ g/mol and about $20 \times 10^6$ g/mol, or between about $3 \times 10^6$ g/mol and about $10 \times 10^6$ g/mol, or between about $3 \times 10^6$ g/mol and about $6 \times 10^6$ g/mol.

In one aspect, the high density polyethylene polymers are a homopolymer of ethylene. In another embodiment, the high density polyethylene polymers may be copolymers. For instance, the high density polyethylene polymers may be copolymers of ethylene and another olefin containing from 3 to 16 carbon atoms, such as from 3 to 10 carbon atoms, such as from 3 to 8 carbon atoms. These other olefins include, but are not limited to, propylene, 1-butene, 1-pentene, 1-hexene, 1-heptene, 1-octene, 4-methylpent-1-ene, 1-decene, 1-dodecene, 1-hexadecene and the like. Also utilizable herein are polyene comonomers such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene. When present, the amount of the non-ethylene monomer(s) in the one or more copolymers may be less than about 10 mol. %, such as less than about 5 mol. %, such as less than about 2.5 mol. %, such as less than about 1 mol. %, wherein the mol. % is based on the total moles of monomer in the polymer.

In one embodiment, the high density polyethylene polymers may have a monomodal molecular weight distribution. Alternatively, the high density polyethylene polymers may exhibit a bimodal molecular weight distribution. For instance, a bimodal distribution generally refers to a polymer having a distinct higher molecular weight and a distinct lower molecular weight (e.g. two distinct peaks) on a size exclusion chromatography or gel permeation chromatography curve. In another embodiment, the high density polyethylene polymers may exhibit more than two molecular weight distribution peaks such that the polyethylene exhibits a multimodal (e.g., trimodal, tetramodal, etc.) distribution. Alternatively, the high density polyethylene polymers may exhibit a broad molecular weight distribution wherein the polyethylene is comprised of a blend of higher and lower molecular weight components such that the size exclusion chromatography or gel permeation chromatography curve does not exhibit at least two distinct peaks but instead exhibits one distinct peak broader than the individual component peaks.

Any method known in the art can be utilized to synthesize the polyethylene polymers. Polyethylene powders are typically produced by the catalytic polymerization of ethylene monomer or optionally with one or more other 1-olefin co-monomers, the 1-olefin content in the final polymer being less or equal to 10% of the ethylene content, with a heterogeneous catalyst and an organo aluminum or magnesium compound as cocatalyst. The ethylene is usually polymerized in gaseous phase or slurry phase at relatively low temperatures and pressures. The polymerization reaction may be carried out at a temperature of between 50° C. and 100° C. and pressures in the range of 0.02 and 2 MPa.

The molecular weight of the polyethylene can be adjusted by adding hydrogen. Altering the temperature and/or the type and concentration of the co-catalyst may also be used to fine tune the molecular weight. Additionally, the reaction may occur in the presence of antistatic agents to avoid fouling and product contamination.

Suitable catalyst systems include but are not limited to Ziegler-Natta type catalysts. Typically Ziegler-Natta type catalysts are derived by a combination of transition metal compounds of Groups 4 to 8 of the Periodic Table and alkyl or hydride derivatives of metals from Groups 1 to 3 of the Periodic Table. Transition metal derivatives used usually comprise the metal halides or esters or combinations thereof. Exemplary Ziegler-Natta catalysts include those based on the reaction products of organo aluminum or magnesium compounds, such as for example but not limited to aluminum or magnesium alkyls and titanium, vanadium or chromium halides or esters. The heterogeneous catalyst might be either unsupported or supported on porous fine grained materials, such as silica or magnesium chloride. Such support can be added during synthesis of the catalyst or may be obtained as a chemical reaction product of the catalyst synthesis itself.

In one embodiment, a suitable catalyst system can be obtained by the reaction of a titanium(IV) compound with a trialkyl aluminum compound in an inert organic solvent at temperatures in the range of −40° C. to 100° C., preferably −20° C. to 50° C. The concentrations of the starting materials are in the range of 0.1 to 9 mol/L, preferably 0.2 to 5 mol/L, for the titanium(IV) compound and in the range of 0.01 to 1 mol/L, preferably 0.02 to 0.2 mol/L for the trialkyl aluminum compound. The titanium component is added to the aluminum component over a period of 0.1 min to 60 min, preferably 1 min to 30 min, the molar ratio of titanium and aluminum in the final mixture being in the range of 1:0.01 to 1:4.

In another embodiment, a suitable catalyst system is obtained by a one or two-step reaction of a titanium(IV) compound with a trialkyl aluminum compound in an inert organic solvent at temperatures in the range of −40° C. to 200° C., preferably −20° C. to 150° C. In the first step the titanium(IV) compound is reacted with the trialkyl aluminum compound at temperatures in the range of −40° C. to 100° C., preferably −20° C. to 50° C. using a molar ratio of titanium to aluminum in the range of 1:0.1 to 1:0.8. The concentrations of the starting materials are in the range of 0.1 to 9.1 mol/L, preferably 5 to 9.1 mol/L, for the titanium (IV) compound and in the range of 0.05 and 1 mol/L, preferably 0.1 to 0.9 mol/L for the trialkyl aluminum compound. The titanium component is added to the aluminum compound over a period of 0.1 min to 800 min, preferably 30 min to 600 min. In a second step, if applied, the reaction product obtained in the first step is treated with a trialkyl aluminum compound at temperatures in the range of −10° C. to 150° C., preferably 10° C. to 130° C. using a molar ratio of titanium to aluminum in the range of 1:0.01 to 1:5.

In yet another embodiment, a suitable catalyst system is obtained by a procedure wherein, in a first reaction stage, a magnesium alcoholate is reacted with a titanium chloride in an inert hydrocarbon at a temperature of 50° to 100° C. In a second reaction stage the reaction mixture formed is subjected to heat treatment for a period of about 10 to 100 hours at a temperature of 110° to 200° C. accompanied by evolution of alkyl chloride until no further alkyl chloride is evolved, and the solid is then freed from soluble reaction products by washing several times with a hydrocarbon.

In a further embodiment, catalysts supported on silica, such as for example the commercially available catalyst system Sylopol 5917 can also be used.

Using such catalyst systems, the polymerization is normally carried out in suspension at low pressure and temperature in one or multiple steps, continuous or batch. The polymerization temperature is typically in the range of 30° C. to 130° C., preferably is the range of 50° C. and 90° C. and the ethylene partial pressure is typically less than 10 MPa, preferably 0.05 and 5 MPa. Trialkyl aluminums, like for example but not limited to isoprenyl aluminum and triisobutyl aluminum, are used as co-catalyst such that the ratio of Al:Ti (co-catalyst versus catalyst) is in the range of 0.01 to 100:1, more preferably is the range of 0.03 to 50:1. The solvent is an inert organic solvent as typically used for Ziegler type polymerizations. Examples are butane, pentane, hexane, cyclohexane, octane, nonane, decane, their isomers and mixtures thereof. The polymer molecular mass is controlled through feeding hydrogen. The ratio of hydrogen partial pressure to ethylene partial pressure is in the range of 0 to 50, preferably the range of 0 to 10. The polymer is isolated and dried in a fluidized bed drier under nitrogen. The solvent may be removed through steam distillation in case of using high boiling solvents. Salts of long chain fatty acids may be added as a stabilizer. Typical examples are calcium, magnesium and zinc stearate.

Optionally, other catalysts such as Phillips catalysts, metallocenes and post metallocenes may be employed. Generally, a cocatalyst such as alumoxane or alkyl aluminum or alkyl magnesium compound is also employed. Other suitable catalyst systems include Group 4 metal complexes of phenolate ether ligands.

In one embodiment, one or more of the polyethylene polymers present in the polymer composition of the present disclosure have a relatively low bulk density as measured according to DIN53466. For instance, in one embodiment, the bulk density of one or more of the polyethylene polymers is generally less than about 0.5 $g/cm^3$, such as less than about 0.4 $g/cm^3$, such as less than about 0.35 $g/cm^3$, such as less than about 0.33 $g/cm^3$, such as less than about 0.28 $g/cm^3$, such as less than about 0.26 $g/cm^3$. The bulk density is generally greater than about 0.1 $g/cm^3$, such as greater than about 0.15 $g/cm^3$.

As described above, each of the polyethylene polymers contained in the composition of the present disclosure have a different molecular weight, particularly a different average molecular weight. The average molecular weight is determined according to the Margolies equation. The molecular weight can be determined by first measuring the viscosity number according to DIN EN ISO Test 1628. Dry powder flow is measured using a 25 mm nozzle. The molecular weight is then calculated using the Margolies equation from the viscosity numbers.

The first polyethylene polymer contained in the polymer composition of the present disclosure generally has a lower molecular weight than the second polyethylene polymer and the third polyethylene polymer. The first polyethylene polymer, for instance, can have a molecular weight of generally from about 300,000 g/mol to about 1 million g/mol, including all increments of 50 g/mol therebetween. For instance, the molecular weight can be greater than about 400,000 g/mol, such as greater than about 500,000 g/mol, such as greater than about 550,000 g/mol, such as greater than about 580,000 g/mol. The molecular weight can be less than about 900,000 g/mol, such as less than about 800,000 g/mol, such as less than about 700,000 g/mol, such as less than about 650,000 g/mol.

The amount that the first polyethylene polymer is present in the polymer composition can vary depending upon various factors including the desired result. In one aspect, the first polyethylene polymer can be added to the polymer composition in an amount sufficient to improve processing of the composition, especially during gel extrusion processes. In one embodiment, the first polyethylene polymer is present in the polymer composition in an amount greater than about 3% by weight, such as in an amount greater than about 5% by weight, such as in an amount greater than about 7% by weight, such as in an amount greater than about 9% by weight, and generally in an amount less than about 25%, such as in an amount less than about 22% by weight, such as in an amount less than about 18% by weight, such as in an amount less than about 15% by weight, such as in an amount less than about 12% by weight based upon the total amount of polyethylene polymer present in the polymer composition. For instance, the above weight percentages are based upon the total amount of the first polyethylene polymer present, the second polyethylene polymer present, and the third polyethylene polymer present.

The second polyethylene polymer present in the polymer composition generally has a molecular weight of from about 1,000,000 g/mol to about 2,900,000 g/mol, including all increments of 50,000 g/mol therebetween. For instance, the second polyethylene polymer can have a molecular weight of greater than about 1,100,000 g/mol, such as greater than about 1,300,000 g/mol, such as greater than about 1,500,000 g/mol, such as greater than about 1,700,000 g/mol, such as greater than about 1,800,000 g/mol, such as greater than about 1,900,000 g/mol, and generally less than about 2,500,000 g/mol, such as less than about 2,300,000 g/mol, such as less than about 2,200,000 g/mol, such as less than about 2,100,000 g/mol, such as less than about 2,050,000 g/mol.

The second polyethylene polymer can be present in the polymer composition in an amount greater than the first polyethylene polymer and the third polyethylene polymer. For instance, the second polyethylene polymer can be the primary polymer contained in the polymer composition. In other embodiments, however, the third polyethylene polymer may be present in an amount greater than the second polyethylene polymer. The second polyethylene polymer can be present in the polymer composition, based on the total amount of polyethylene polymer present, in an amount greater than about 25% by weight, such as in an amount greater than about 30% by weight, such as in an amount greater than about 34% by weight, such as in an amount greater than about 38% by weight, such as in an amount greater than about 42% by weight, such as in an amount greater than about 48% by weight, such as in an amount greater than about 53% by weight, such as in an amount greater than about 58% by weight, such as in an amount greater than about 62% by weight, such as in an amount greater than about 68% by weight, such as in an amount greater than about 73% by weight. The second polyethylene polymer is generally present in the polymer composition in an amount less than about 85% by weight, such as in an amount less than about 70% by weight, such as in an amount less than about 65% by weight, such as in an amount less than about 60% by weight, such as in an amount less about 55% by weight, such as in an amount less than about 50% by weight, based upon the total amount of polyethylene polymer present in the composition.

The third polyethylene polymer having the highest molecular weight can generally have a molecular weight of from about 2 million g/mol to about 10 million g/mol, including all increments of 50,000 g/mol therebetween. For instance, the third polyethylene polymer can have a molecular weight of greater than about 3,000,000 g/mol, such as greater than about 4,000,000 g/mol, such as greater than about 4,500,000 g/mol, such as greater than about 4,800,000 g/mol. The molecular weight of the third polyethylene polymer is generally less than about 9,000,000 g/mol, such as less than about 8,000,000 g/mol, such as less than about 7,000,000 g/mol, such as less than about 6,000,000 g/mol, such as less than about 5,500,000 g/mol.

The third polyethylene polymer can be present in the polymer composition generally in an amount from about 5% by weight to about 60% by weight, based upon the total weight of polyethylene polymer present in the composition. For example, the third polyethylene polymer can be present in the polymer composition in an amount greater than about 12% by weight, such as in an amount greater than about 14% by weight, such as in an amount greater than about 16% by weight, such as in an amount greater than about 18% by weight, such as in an amount greater than about 22% by weight, such as in an amount greater than about 25% by weight, such as in an amount greater than about 28% by weight, such as in an amount greater than about 30% by weight, such as in an amount greater than about 35% by weight. The third polyethylene polymer is generally present in an amount less than about 50% by weight, such as in an amount less than about 48% by weight, such as in an amount less than about 45% by weight, such as in an amount less than about 42% by weight, such as in an amount less than about 38% by weight, such as in an amount less than about 35% by weight, such as in an amount less than about 33% by weight, such as in an amount less than about 30% by weight, based upon the total weight of polyethylene polymer present in the composition.

Prior to forming articles from the polymer composition of the present disclosure, each of the polyethylene polymers can be present in the form of particles. For example, in one embodiment, the polymer composition contains particles only formed from the first polyethylene polymer, particles only formed from the second polyethylene polymer, and particles only formed from the third polyethylene polymer that have been blended together. Alternatively, two or more of the polyethylene polymers can be preblended or compounded together. For instance, the polymer particles can contain at least two of the polyethylene polymers. Each particle, for instance, can contain a combination of the second polyethylene polymer and the third polyethylene polymer, a combination of the first polyethylene polymer and the second polyethylene polymer, a combination of the first polyethylene polymer and the third polyethylene polymer, or can contain a combination of the first polyethylene polymer, the second polyethylene polymer, and the third polyethylene polymer.

In one embodiment, the polyethylene particles can be a free-flowing powder. The particles can have a median particle size (d50) by volume of less than 210 microns. For example, the median particle size (d50) of the polyethylene particles can be less than about 170 microns, such as less than about 150 microns. The median particle size (d50) is generally greater than about 20 microns, such as greater than about 70 microns, such as greater than about 110 microns. The powder particle size can be measured utilizing a laser diffraction method according to ISO 13320.

In one embodiment, 90% of the polyethylene particles can have a particle size of less than about 250 microns. In other embodiments, 90% of the polyethylene particles can have a particle size of less than about 200 microns, such as less than about 170 microns.

Each of the polyethylene polymers may have a viscosity number of from at least 100 mL/g, such as at least 500 mL/g, such as at least 700 mL/g, such as at least 900 mL/g, such as at least 1,000 mL/g, to less than about 6,000 mL/g, such as less than about 5,000 mL/g, such as less than about 4,000 mL/g, such as less than about 3,000 mL/g, such as less than about 1,800 mL/g, as determined according to ISO 1628 part 3 utilizing a concentration in decahydronapthalene of 0.0002 g/mL.

The high density polyethylene polymers may have a crystallinity of from at least about 40% to 85%, such as from 45% to 80%. In one aspect, the crystallinity can be greater than about 50%, such as greater than about 55%, such as greater than about 60%, such as greater than about 65%, such as greater than about 70%, and generally less than about 80%.

In forming gel extruded articles, the polyethylene particles containing the first polyethylene polymer, the second polyethylene polymer, and the third polyethylene polymer can be combined with a plasticizer to form a polymer composition that is then well suited for producing gel extruded articles, such as porous membranes. In general, the polyethylene particles are present in the polymer composition in an amount up to about 50% by weight. For instance, the high density polyethylene particles can be present in the polymer composition in an amount less than about 45% by weight, such as in an amount less than about 40% by weight, such as in an amount less than about 35% by weight, such as in an amount less than about 30% by weight, such as in an amount less than about 25% by weight, such as in an amount less than about 20% by weight, such as in an amount less than about 15% by weight. The polyethylene particles can be present in the composition in an amount greater than about 5% by weight, such as in an amount greater than about 10% by weight, such as in an amount greater than about 15% by weight, such as in an amount greater than about 20% by weight, such as in an amount greater than about 25% by weight. During gel processing, a plasticizer is combined with the high density polyethylene particles which can be substantially or completely removed in forming polymer articles. For example, in one embodiment, the resulting polymer article can contain the polyethylene polymers in an amount greater than about 70% by weight, such as in an amount greater than about 80% by weight, such as in an amount greater than about 85% by weight, such as in an amount greater than about 90% by weight, such as in an amount greater than about 95% by weight.

In general, any suitable plasticizer can be combined with the different polyethylene polymers. The plasticizer, for instance, may comprise a hydrocarbon oil, an alcohol, an ether, an ester such as a diester, or mixtures thereof. For instance, suitable plasticizers include mineral oil, a paraffinic oil, decaline, and the like. Other plasticizers include xylene, dioctyl phthalate, dibutyl phthalate, stearyl alcohol, oleyl alcohol, decyl alcohol, nonyl alcohol, diphenyl ether, n-decane, n-dodecane, octane, nonane, kerosene, toluene, naphthalene, tetraline, and the like. In one embodiment, the plasticizer may comprise a halogenated hydrocarbon, such as monochlorobenzene. Cycloalkanes and cycloalkenes may also be used, such as camphene, methane, dipentene, methylcyclopentandiene, tricyclodecane, 1,2,4,5-tetramethyl-1,4-cyclohexadiene, and the like. The plasticizer may comprise mixtures and combinations of any of the above as well.

The plasticizer is generally present in the composition used to form the polymer articles in an amount greater than about 50% by weight, such as in an amount greater than about 55% by weight, such as in an amount greater than about 60% by weight, such as in an amount greater than about 65% by weight, such as in an amount greater than about 70% by weight, such as in an amount greater than about 75% by weight, such as in an amount greater than about 80% by weight, such as in an amount greater than about 85% by weight, such as in an amount greater than about 90% by weight, such as in an amount greater than about 95% by weight, such as in an amount greater than about 98% by weight. In fact, the plasticizer can be present in an amount up to about 99.5% by weight.

The polyethylene particles blend with the plasticizer to form a homogeneous gel-like material.

In order to form polymer articles in accordance with the present disclosure, the polyethylene particles are combined with the plasticizer and extruded through a die of a desired shape. In one embodiment, the composition can be heated within the extruder. For example, the plasticizer can be combined with the particle mixture and fed into an extruder. In accordance with the present disclosure, the plasticizer and particle mixture form a homogeneous gel-like material prior to leaving the extruder for forming polymer articles with little to no impurities.

In one embodiment, elongated articles are formed during the gel spinning or extruding process. The polymer article, for instance, may be in the form of a fiber or a film, such as a membrane.

During the process, at least a portion of the plasticizer is removed from the final product. The plasticizer removal process may occur due to evaporation when a relatively volatile plasticizer is used. Otherwise, an extraction liquid can be used to remove the plasticizer. The extraction liquid may comprise, for instance, a hydrocarbon solvent. One example of the extraction liquid, for instance, is dichloromethane. Other extraction liquids include acetone, chloroform, an alkane, hexene, heptene, an alcohol, or mixtures thereof.

If desired, the resulting polymer article can be stretched at an elevated temperature below the melting point of the polymer mixture to increase strength and modulus. Suitable temperatures for stretching are in the range of from about ambient temperature to about 155° C. The draw ratios can generally be greater than about 4, such as greater than about 6, such as greater than about 8, such as greater than about 10, such as greater than about 15, such as greater than about 20, such as greater than about 25, such as greater than about 30. In certain embodiments, the draw ratio can be greater than about 50, such as greater than about 100, such as greater than about 110, such as greater than about 120, such as greater than about 130, such as greater than about 140, such as greater than about 150. Draw ratios are generally less than about 1,000, such as less than about 800, such as less than about 600, such as less than about 400. In one embodiment, lower draw ratios are used such as from about 4 to about 10. The polymer article can be uniaxially stretched or biaxially stretched.

Polymer articles made in accordance with the present disclosure have numerous uses and applications. For example, in one embodiment, the process is used to produce a membrane. The membrane can be used, for instance, as a battery separator. Alternatively, the membrane can be used as a microfilter. When producing fibers, the fibers can be used to produce nonwoven fabrics, ropes, nets, and the like. In one embodiment, the fibers can be used as a filler material in ballistic apparel.

Referring to FIG. 1, one embodiment of a lithium ion battery 10 made in accordance with the present disclosure is shown. The battery 10 includes an anode 12 and a cathode 14. The anode 12, for instance, can be made from a lithium metal. The cathode 14, on the other hand, can be made from sulfur or from an intercalated lithium metal oxide. In accordance with the present disclosure, the battery 10 further includes a porous membrane 16 or separator that is positioned between the anode 12 and the cathode 14. The porous membrane 16 minimizes electrical shorts between the two electrodes while allowing the passage of ions, such as lithium ions. As shown in FIG. 1, in one embodiment, the porous membrane 16 is a single layer polymer membrane and does not include a multilayer structure. In one aspect, the single layer polymer membrane may also include a coating. The coating can be an inorganic coating made from, for instance, aluminum oxide or a titanium oxide. Alternatively, the single layer polymer membrane may also include a polymeric coating. The coating can provide increased thermal resistance.

Porous membranes made according to the present disclosure can generally have a thickness of greater than about 5 microns, such as greater than about 6 microns, such as greater than about 7 microns, such as greater than about 8 microns, such as greater than about 9 microns, such as greater than about 10 microns, such as greater than about 11 microns. The thickness of the membranes is generally less than about 20 microns, such as less than about 16 microns, such as less than about 14 microns, such as less than about 12 microns, such as less than about 10 microns, such as less than about 8 microns.

Membranes made according to the present disclosure can have excellent physical properties. For example, membranes having a porosity of from about 35% to about 38% can have a puncture strength of greater than about 1,450 mN/micron, such as greater than about 1,475 mN/micron, such as greater than about 1,500 mN/micron, such as greater than about 1,525 mN/micron, such as greater than about 1,550 mN/micron, such as greater than about 1,575 mN/micron, such as greater than about 1,600 mN/micron, such as greater than about 1,625 mN/micron, such as greater than about 1,650 mN/micron, and generally less than about 3,000 mN/micron. The pin strength can be greater than about 252 $gf/g/cm^2$, such as greater than about 254 $gf/g/cm^2$, such as greater than about 256 $gf/g/cm^2$, such as greater than about 258 $gf/g/cm^2$, such as greater than about 260 $gf/g/cm^2$, such as greater than about 262 $gf/g/cm^2$, and generally less than about 300 $gf/g/cm^2$.

At a membrane porosity of from about 45% to about 50%, the membrane can have a puncture strength of greater than about 340 mN/micron, such as greater than about 350 mN/micron, such as greater than about 360 mN/micron, such as greater than about 370 mN/micron, such as greater than about 380 mN/micron, such as greater than about 390 mN/micron, such as greater than about 400 mN/micron, and generally less than about 600 mN/micron and can have a pin strength of greater than about 72 $gf/g/cm^2$, such as greater than about 74 $gf/g/cm^2$, such as greater than about 76 $gf/g/cm^2$, such as greater than about 78 $gf/g/cm^2$, such as greater than about 80 $gf/g/cm^2$, such as greater than about 82 $gf/g/cm^2$, and generally less than about 150 $gf/g/cm^2$.

Membranes made according to the present disclosure can also have excellent tensile strength properties in either the machine direction or the cross-machine direction. For instance, in either direction, the membrane can have a tensile strength of greater than about 155 MPa, such as greater than about 160 MPA, such as greater than about 162 MPa, such as greater than about 164 MPa, such as greater than about 166 MPa, such as greater than about 168 MPa, such as greater than about 170 MPa, and generally less than about 250 MPa.

Polymer membranes made according to the present disclosure can have a Gurley permeability of greater than about 105 sec/100 ml, such as greater than about 150 sec/100 ml, such as greater than about 200 sec/100 ml, such as greater than about 225 sec/100 ml, such as greater than about 250 sec/100 ml, such as greater than about 275 sec/100 ml, such as greater than about 300 sec/100 ml, such as greater than about 325 sec/100 ml, such as greater than about 350 sec/100 ml, such as greater than about 375 sec/100 ml, such as greater than about 400 sec/100 ml, such as greater than about 425 sec/100 ml, such as greater than about 450 sec/100 ml, such as greater than about 475 sec/100 ml, such as greater than about 500 sec/100 ml, such as greater than about 525 sec/100 ml, such as greater than about 550 sec/100 ml, such as greater than about 575 sec/100 ml, such as greater than about 600 sec/100 ml, and generally less than about 1,000 sec/100 ml.

The polymer composition and polymer articles made in accordance with the present disclosure may contain various other additives, such as nucleating agents, heat stabilizers, light stabilizers, UV absorbers, acid scavengers, flame retardants, lubricants, colorants, and the like.

Examples of nucleating agents include phosphate esters. Examples of nucleating agents that may be used include Methylen-bis(4,6-di-t-butylphenyl)phosphate sodium salt and aluminium hydroxy-bis[2,4,8,10-tetrakis(1,1-dimethylethyl)-6-hydroxy-12H-dibenzo-[d,g]-dioxa-phoshocin-6-oxidato]. Other examples of nucleating agents include nonitol, 1,2,3-trideoxy-4,6:5,7-bis-O-[(4-propylphenyl) methylene)] or 3,4-Dimethylbenzylidene sorbitol (e.g. a sorbitol). Another nucleating agent that may be used for the composition is, for example, N-[3,5-bis-(2,2-dimethyl-propionylamino)-phenyl]-2,2-dimethylpropionamide.

The one or more nucleating agents can be present in the polymer composition in an amount greater than about 100 ppm, such as in an amount greater than about 300 ppm, such as in an amount greater than about 500 ppm, such as in an amount greater than about 600 ppm, and generally less than about 20,000 ppm, such as less than about 10,000 ppm, such as less than about 4000 ppm, such as less than about 2000 ppm, such as less than about 1500 ppm, such as less than about 1000 ppm.

In one embodiment, a heat stabilizer may be present in the composition. The heat stabilizer may include, but is not limited to, phosphites, aminic antioxidants, phenolic antioxidants, or any combination thereof.

In one embodiment, an antioxidant may be present in the composition. The antioxidant may include, but is not limited to, secondary aromatic amines, benzofuranones, sterically hindered phenols, or any combination thereof.

In one embodiment, a light stabilizer may be present in the composition. The light stabilizer may include, but is not limited to, 2-(2'-hydroxyphenyl)-benzotriazoles, 2-hydroxy-4-alkoxybenzophenones, nickel containing light stabilizers, 3,5-di-tert-butyl-4-hydroxbenzoates, sterically hindered amines (HALS), or any combination thereof.

In one embodiment, a UV absorber may be present in the composition in lieu of or in addition to the light stabilizer. The UV absorber may include, but is not limited to, a benzotriazole, a benzoate, or a combination thereof, or any combination thereof.

In one embodiment, a halogenated flame retardant may be present in the composition. The halogenated flame retardant may include, but is not limited to, tetrabromobisphenol A (TBBA), tetrabromophthalic acid anhydride, dedecachloropentacyclooctadecadiene (dechlorane), hexabromocyclodedecane, chlorinated paraffins, or any combination thereof.

In one embodiment, a non-halogenated flame retardant may be present in the composition. The non-halogenated flame retardant may include, but is not limited to, resorcinol diphosphoric acid tetraphenyl ester (RDP), ammonium polyphosphate (APP), phosphine acid derivatives, triaryl phosphates, trichloropropylphosphate (TCPP), magnesium hydroxide, aluminum trihydroxide, antimony trioxide.

In one embodiment, a lubricant may be present in the composition. The lubricant may include, but is not limited to, silicone oil, waxes, molybdenum disulfide, or any combination thereof.

In one embodiment, a colorant may be present in the composition. The colorant may include, but is not limited to, inorganic and organic based color pigments.

In one aspect, an acid scavenger may be present in the polymer composition. The acid scavenger, for instance, may comprise an alkali metal salt or an alkaline earth metal salt. The salt can comprise a salt of a fatty acid, such as a stearate. Other acid scavengers include carbonates, oxides, or hydroxides. Particular acid scavengers that may be incorporated into the polymer composition include a metal stearate, such as calcium stearate. Still other acid scavengers include zinc oxide, calcium carbonate, magnesium oxide, and mixtures thereof.

These additives may be used singly or in any combination thereof. In general, each additive may be present in an amount of at least about 0.05 wt. %, such as at last about 0.1 wt. %, such as at least about 0.25 wt. %, such as at least about 0.5 wt. %, such as at least about 1 wt. % and generally less than about 20 wt. %, such as less than about 10 wt. %, such as less than about 5 wt. %, such as less than about 4 wt. %, such as less than about 2 wt. %. The sum of the wt. % of all of the components, including any additives if present, utilized in the polymer composition will be 100 wt. %.

The present disclosure may be better understood with reference to the following example. The following example is given below by way of illustration and not by way of limitation. The following experiments were conducted in order to show some of the benefits and advantages of the present invention.

Example No. 1

Various different polyethylene polymer compositions were formulated, formed into a membrane, and tested for various physical properties. More particularly, three different polyethylene polymers were blended together to form the membranes and compared to a membrane made from a single polyethylene polymer. The resin compositions were prepared into membranes via gel extrusion, biaxial stretching, and solvent extraction as are conventional.

The following polyethylene polymers were used:
First polyethylene polymer: 600,000 g/mol molecular weight, D50 particle size of 115 microns
Second polyethylene polymer: 1,700,000 g/mol molecular weight, D50 particle size of 135 microns
Third polyethylene polymer: 5,000,000 g/mol molecular weight, D50 particle size of 155 microns Each of the formulations in the table below were combined with a plasticizer and gel extruded to form the membranes. The plasticizer was almost completely removed from the final product. The following results were obtained:

| Sample No. | First Polyethylene Polymer | Second Polyethylene Polymer | Third Polyethylene Polymer | VN of formulation | Gel sheet thickness/ mm | Membrane thickness/ μm | Gurley s/100 ml | Porosity/ % | MD Tensile/ MPa | TD Tensile/ MPa | Puncture strength/ mN/μm | Pin Strength/ gf/g/cm² |
|---|---|---|---|---|---|---|---|---|---|---|---|---|
| 1 | 0 | 100 | 0 | 1100 | 0.83-0.85 | 11.1 | 422 | 31 | 153.3 | 161 | 1433 | 223.4 |
| 2 | 5 | 75 | 20 |  | 0.84-0.86 | 11.1 | 441 | 35 | 164.8 | 160.4 | 1559 | 257.4 |
| 3 | 10 | 60 | 30 |  | 0.82-0.86 | 11.9 | 607 | 28 | 170.5 | 167.4 | 1659 | 249.3 |
| 4 | 0 | 100 | 0 | 1100 |  | 6.7 | 132 | 37 | 151.2 | 136.7 | 1449 | 250 |

-continued

| Sample No. | First Polyethylene Polymer | Second Polyethylene Polymer | Third Polyethylene Polymer | VN of formulation | Gel sheet thickness/ mm | Membrane thickness/ μm | Gurley s/100 ml | Porosity/ % | MD Tensile/ MPa | TD Tensile/ MPa | Puncture strength/ mN/μm | Pin Strength/ gf/g/cm² |
|---|---|---|---|---|---|---|---|---|---|---|---|---|
| 5 | 10 | 55 | 35 | 1345 |  | 8.3 | 189 | 36 | 165.5 | 160.9 | 1482 | 250 |
| 6 | 10 | 50 | 40 |  |  | 7.7 | 218 | 36 | 157.8 | 157.3 | 1570 | 263 |
| 7 | 0 | 100 | 0 | 1100 |  | 14.7 |  | 49 |  |  | 331.24 | 70 |
| 8 | 15 | 55 | 30 |  |  | 8.13 | 122.8 | 46.46 |  |  | 388.08 | 77.8 |
| 9 | 10 | 70 | 20 |  |  | 7.35 | 100.3 | 48.31 |  |  | 400.82 | 82.8 |

Example No. 2

The process described in Example No. 1 was repeated and further polymer membranes were produced (Sample Nos. 10 through 13).

The following polyethylene polymers were used:
First polyethylene polymer: 600,000 g/mol molecular weight, D50 particle size of 115 microns
Second polyethylene polymer: 1,700,000 g/mol molecular weight, D50 particle size of 135 microns (for Sample Nos. 10 through 12); 2,000,000 g/mol molecular weight, D50 particle size of 115 microns (for Sample No. 13)
Third polyethylene polymer: 5,000,000 g/mol molecular weight, D50 particle size of 155 microns Sample Nos. 11 and 12 also contained a nucleating agent at a concentration of 700 ppm. The nucleating agent was sodium 2,2'-methylene bis-(4,6-di-tert-butylphenyl) phosphate Each of the formulations in the table below were combined with a plasticizer and gel extruded to form the membranes. The plasticizer was almost completely removed from the final product. The following results were obtained:

| Sample No. | First Polyethylene Polymer | Second Polyethylene Polymer | Third Polyethylene Polymer | Molding Pressure (psi) |
|---|---|---|---|---|
| 10 | 0 | 100 | 0 | 51 |
| 11 | 10 | 70 | 20 | 48 |
| 12 | 10 | 60 | 30 | 50 |
| 13 | 10 | 75 | 15 | 27 |

| Sample No. | Membrane thickness/ μm | Gurley s/100 ml | Porosity/% | MD Tensile/MPa | TD Tensile/MPa | Puncture strength/ mN/μm | Pin Strength/ gf/g/cm² |
|---|---|---|---|---|---|---|---|
| 10 | 14 | 401 | 39 | 171.1 | 127.6 | 1237 |  |
| 11 | 10.7 | 440 | 31 | 168.8 | 149.9 | 1545 | 239.2 |
| 12 | 11.2 | 465 | 33 | 165.4 | 157.3 | 1574 | 251.8 |
| 13 | 8.8 | 347 | 32 | 201.4 | 175.1 | 1564 | 229.8 |

As shown above, membranes made according to the present disclosure have increased pin puncture strength and are easier to process. The combination of these properties is dramatic and unexpected.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only and is not intended to limit the invention so further described in such appended claims.

What is claimed:

1. The polymer composition for producing gel extruded articles comprising:
a plasticizer; and
polymer particles comprising a first polyethylene polymer, a second polyethylene polymer, and a third polyethylene polymer, the first polyethylene polymer having a molecular weight of from about 300,000 g/mol to about 1 million g/mol, the first polyethylene polymer being present in an amount of from about 3% to about 25% by weight of the polymer particles, the second polyethylene polymer having a molecular weight of from about 1 million g/mol to about 2.9 million g/mol, the second polyethylene polymer being present in an amount of from about 25% to about 85% by weight of the polymer particles, the third polyethylene polymer having a molecular weight of from about 2 million g/mol to about 10 million g/mol, the third polyethylene polymer being present in an amount of from about 5% to about 48% by weight of the polymer particles.

2. The polymer composition as defined in claim 1, wherein the polymer particles include polymer particles only made from the first polyethylene polymer, polymer particles only made from the second polyethylene polymer, and polymer particles only made from the third polyethylene polymer.

3. The polymer composition as defined in claim 1, wherein the polymer particles include particles that comprise at least two of the polyethylene polymers.

4. The polymer composition as defined in claim 1, wherein the first polyethylene polymer has a molecular weight of from about 500,000 g/mol to about 700,000 g/mol, the second polyethylene polymer has a molecular weight of from about 1.5 million g/mol to about 2.1 million g/mol, and the third polyethylene polymer has a molecular weight of from about 4 million g/mol to about 8 million g/mol.

5. The polymer composition as defined in claim 1, wherein the first polyethylene polymer is present in an amount of from about 5% to about 15% by weight of the polymer particles, the second polyethylene polymer is present in an amount of from about 50% to about 75% by weight of the polymer particles, and the third polyethylene polymer is present in an amount of from about 20% to about 40% by weight of the polymer particles.

6. The polymer composition as defined in claim 1, wherein a membrane formed from the polymer composition has a porosity of from about 35% to about 38% and has a puncture strength greater than 1450 mN/micron and a pin strength of greater than about 252 gf/g/cm$^2$.

7. The polymer composition as defined in claim 1, wherein a membrane formed from the polymer composition has a porosity of from about 38% to about 50% and has a puncture strength greater than 340 mN/micron and a pin strength of greater than about 72 gf/g/cm$^2$.

8. The polymer composition as defined in claim 1, wherein the polymer composition has a viscosity number of from about 1000 to about 1800.

9. The polymer composition as defined in claim 1, wherein the polymer particles have a median particle size by volume of from about 70 microns to about 210 microns.

10. The polymer composition as defined in claim 1, wherein the polymer particles are present in the composition in an amount up to about 50% by weight.

11. The polymer composition as defined in claim 1, wherein the plasticizer comprises mineral oil, a paraffinic oil, a hydrocarbon, an alcohol, an ether, an ester, or mixtures thereof.

12. The polymer composition as defined in claim 1, wherein the polymer composition is polypropylene-free.

13. A process for producing polymer articles comprising:
    forming the polymer composition as defined in claim 1 into a gel-like composition;
    extruding the gel-like composition through a die to form a polymer article, the polymer article comprising a film; and
    removing at least part of the plasticizer from the polymer article.

14. The porous membrane comprising:
    a polymer blend comprising a first polyethylene polymer, a second polyethylene polymer, and a third polyethylene polymer, the first polyethylene polymer having a molecular weight of from about 400,000 g/mol to about 1 million g/mol, the first polyethylene polymer being present in an amount of from about 3% to about 18% by weight, the second polyethylene polymer having a molecular weight of from about 1.1 million g/mol to about 2.9 million g/mol, the second polyethylene polymer being present in an amount of from about 34% to about 85% by weight, the third polyethylene polymer having a molecular weight of from about 3 million g/mol to about 10 million g/mol, the third polyethylene polymer being present in an amount of from about 12% to about 48% by weight, the porous membrane having a tensile strength in a machine direction of greater than about 155 MPa.

15. The porous membrane as defined in claim 14, wherein the porous membrane has a porosity of from about 35% to about 38% and has a puncture strength greater than 1450 mN/micron and a pin strength of greater than about 252 gf/g/cm$^2$.

16. The porous membrane as defined in claim 14, wherein the porous membrane has a porosity of from about 45% to about 50% and has a puncture strength greater than 340 mN/micron and a pin strength of greater than about 72 gf/g/cm$^2$.

17. The porous membrane as defined in claim 14, wherein the membrane has a thickness of from about 5 microns to about 20 microns and contains a nucleating agent.

18. The porous membrane as defined in claim 14, wherein the membrane has a Gurley permeability of greater than about 105 sec/100 ml.

19. The porous membrane as defined in claim 14, wherein the porous membrane has been biaxially stretched.

\* \* \* \* \*